(12) United States Patent
Fagot-Revurat

(10) Patent No.: US 8,478,556 B2
(45) Date of Patent: Jul. 2, 2013

(54) CALIBRATION METHOD FOR SAW SENSORS

(75) Inventor: Lionel Fagot-Revurat, Barberier (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 804 days.

(21) Appl. No.: 12/522,244

(22) PCT Filed: Nov. 22, 2007

(86) PCT No.: PCT/EP2007/062679
§ 371 (c)(1),
(2), (4) Date: Jan. 18, 2010

(87) PCT Pub. No.: WO2008/080705
PCT Pub. Date: Jul. 10, 2008

(65) Prior Publication Data
US 2010/0139362 A1  Jun. 10, 2010

(30) Foreign Application Priority Data

Jan. 3, 2007 (FR) ...................................... 07 00033

(51) Int. Cl.
*G10K 11/02* (2006.01)
(52) U.S. Cl.
USPC ........................................................ 702/103
(58) Field of Classification Search
USPC ................. 702/75, 85, 98, 99, 103, 104, 106, 702/130, 138, 168, 183, 188
See application file for complete search history.

(56) References Cited

U.S. PATENT DOCUMENTS

| | | | |
|---|---|---|---|
| 5,014,229 A | 5/1991 | McEachern | |
| 6,321,171 B1 | 11/2001 | Baker | |
| 6,850,859 B1 | 2/2005 | Schuh | |
| 7,203,612 B2 * | 4/2007 | Kobe et al. | 702/75 |
| 2006/0202782 A1 * | 9/2006 | Martin et al. | 333/195 |

FOREIGN PATENT DOCUMENTS

WO  WO 2005/087518  9/2005

* cited by examiner

*Primary Examiner* — Mohamed Charioui
(74) *Attorney, Agent, or Firm* — Cozen O'Connor

(57) ABSTRACT

A calibration process for an SAW sensor of the differential resonator type incorporated in an assembly, the sensor having two resonance frequencies (f1, f2) which vary differently as a function of the value of a physical magnitude (G) of the assembly. The process comprises the steps of: establishing an averaged calibration function ($F_C^{moy}(G)$), which relates the difference between the two resonance frequencies ($\Delta f=f2-f1$) and the physical magnitude (G), said average calibration function being obtained by averaging over a plurality of sensors of the same type ($\Delta f=F_C^{moy}(G)$); determining the difference ($\Delta f_0^{Cap}$) between the two resonance frequencies of the sensor when the physical magnitude (G) corresponds to a predetermined value ($G_0$); determining the deviation of the sensor relative to the averaged calibration function, in frequency or in terms of the difference between the value ($G^{Cap}$) furnished by the sensor and the predetermined value ($G_0$); and determining a corrected value ($G^{corr}$) to be furnished by the sensor, taking account of said deviation.

14 Claims, 4 Drawing Sheets

US 8,478,556 B2

CALIBRATION METHOD FOR SAW SENSORS

RELATED APPLICATIONS

This is a U.S. national stage under 35 USC §371 of application No. PCT/EP2007/062679, filed on Nov. 22, 2007.

This application claims the priority of French application No. 07/00033 filed Jan. 3, 2007, the content of which is hereby incorporated by reference.

FIELD OF THE INVENTION

The present invention concerns calibration methods for SAW sensors fitted on a vehicle, in particular sensors integrated in a tire-wheel assembly of motorized two-wheeled vehicles. Here, "calibration method" is understood to mean determination of the relationship between (a) the response of a sensor designed to measure a physical magnitude and (b) the "real" value of that magnitude (i.e. determination of the "calibration function"), followed by adjustment of the sensor's response with a view to reducing the deviation between the sensor's response and the "real" value of the physical magnitude.

TECHNOLOGICAL BACKGROUND

A surface acoustic wave (SAW) is an acoustic wave which travels along the surface of a material having a certain elasticity, with an amplitude that decreases exponentially with the depth of the substrate. SAW devices which make use of such waves are very commonly used as filters, but are also used as sensors. SAW devices are noted for great sensitivity, low energy consumption and the possibility of being operated within the range of radio frequencies, which is advantageous for the wireless transmission of the data.

It is known to use SAW sensors in tire-wheel elements, as described for example in the document WO 2006/058918 where a tire temperature is measured by a sensor of that type. In such applications, in particular SAW sensors of the "differential resonator" type can be used, which comprise two resonators with different resonance frequencies (f1 and f2) and are dimensioned so that the difference between the frequencies (f2−f1) is a function of the temperature.

One of the difficulties connected with the use of SAW sensors is the poor reproducibility between different sensors, illustrated in FIG. 1 for sensors of the "differential resonator" type. In this particular case, the value of the temperature can only be reproduced with a precision of around 20° C., which is insufficient for most applications at least in the context of tires.

Several solutions for this problem have been proposed. In particular, each SAW sensor can be associated with a Radio Frequency Identification (RFID) device and the calibration function can be stored on the RFID device (see for example the U.S. Pat. No. 7,129,828). When the SAW sensor is interrogated, the reader also interrogates the RFID device to retrieve the corresponding calibration function. This approach indeed allows to obtain satisfactory calibration, but it has a number of disadvantages. Besides high cost, the need to have two emitters can be mentioned (for example, of 433 MHz for the SAW sensor and 915 MHz for the RFID device), as well as two antennas, etc.

Another approach has been proposed in the document WO 2005/087518. This describes the use of a memory card associated with each sensor and containing the calibration parameters of the sensor. The memory cards are inserted into the reader once the sensors have been installed on the vehicle. This achieves good calibration, but such a system is prone to the risk of poor correspondence, i.e. the association of a sensor with a memory card containing the calibration function of another sensor.

Finally, mention should be made of the work carried out by manufacturers of SAW devices to improve the reproducibility of SAW sensors, in particular by collective fabrication processes. Very considerable advances have been achieved recently, but it is likely that the new production processes will result in cost increases.

In summary, the current tendency is to solve the problems of SAW sensors calibration by means of more complex devices and/or production processes, and this entails higher cost.

SUMMARY OF THE INVENTION

An objective of the present invention is to improve the precision of measurements obtained with the currently available SAW sensors of the "resonator" type, without increasing costs and without increasing the weight of the required equipment.

To achieve that objective the inventors chose an approach opposite to the market trend, which is to attempt to calibrate each sensor individually. In particular, the invention is based on the observation that whereas in some applications of SAW sensors a measurement precision of the order of 20° C. is insufficient, on the other hand it is unnecessary to have extremely precise calibration (of the order of one degree) as can be obtained by virtue of an individual calibration function.

The objective is achieved by a calibration process for an SAW sensor of the differential resonator type incorporated in an assembly, the sensor having two resonance frequencies (f1, f2) which vary differently as a function of the value of a physical magnitude (G) of the assembly, the said process comprising the following stages:

(A) An averaged calibration function ($F_C^{moy}(G)$) is established, which relates the difference between the two resonance frequencies ($\Delta f = f2-f1$) and the physical magnitude (G), the said average calibration function being obtained by averaging over a plurality of sensors of the same type ($\Delta f = F_C^{moy}(G)$).

(B) The difference ($\Delta f_0^{Cap}$) between the two resonance frequencies of the sensor is determined when the physical magnitude (G) corresponds to a predetermined value ($G_O$).

(C) The deviation of the sensor relative to the averaged calibration function is determined, in frequency or in terms of the difference between the value ($G^{Cap}$) furnished by the sensor and the predetermined value ($G_O$).

(D) A corrected value ($G^{corr}$) to be furnished by the sensor is determined, taking account of the said deviation.

In a particular embodiment, the frequency deviation ($D_f^{Cap} = F_C^{moy}(G_O) - \Delta f_0^{Cap}$) is considered and the corrected value ($G^{corr}$) of the physical magnitude to be furnished by the sensor for a difference between the sensor's two resonance frequencies (APP) is determined as follows:

$$G^{corr} = (F_C^{moy})^{-1}(\Delta f^{Cap} + D_f^{cap}) \qquad (1)$$

$$= (F_C^{moy})^{-1}(\Delta f^{Cap} + F_C^{moy}(G_O) - \Delta f_0^{Cap})$$

where $(F_C^{moy})^{-1}(\Delta f)$ denotes the reciprocal of the averaged calibration function $F_C^{moy}(G)$.

According to another particular embodiment, the deviation of the sensor in units of G ($D_G^{Cap}=G_0-(F_C^{moy})^{-1}(\Delta f_0^{Cap})$) is considered and the corrected value ($G^{corr}$) of the physical magnitude to be furnished by the sensor for a difference ($\Delta f^{Cap}$) between the sensor's two resonance frequencies is determined as follows:

$$G^{corr} = (F_C^{moy})^{-1}(\Delta f^{Cap}) + D_G^{Cap} \qquad (2)$$
$$= (F_C^{moy})^{-1}(\Delta f^{Cap}) - (F_C^{moy})^{-1}(\Delta f_0^{Cap}) + G_0$$

where $(F_C^{moy})^{-1}(\Delta f)$ again denotes the reciprocal of the averaged calibration function $(F_C^{moy}(G))$.

The averaged calibration function $(F_C^{moy}(G))$ can be obtained by averaging calibration functions of each sensor of the said plurality of sensors $(F_C^i)$ in accordance with the formula:

$$F_C^{moy}(G) = \frac{1}{N} \cdot \sum_i^N F_C^i(G). \qquad (3)$$

NB: $F_C^i$ is the function which, for each sensor i, relates the value $\Delta f$ of the sensor to the physical magnitude G: $\Delta f = F_C^i(G)$.

Another way to obtain an averaged calibration function is to adjust a polynomial, for example of the $2^{nd}$ order, to the group of individual calibration functions, which in particular enables a reduced range of the physical magnitude to be chosen, for which the calibration method is optimized.

The invention can in particular be applied in assemblies where there is little space available for measurement systems and/or when there are substantial cost constraints, such as for measuring the temperature of a tire constituting part of a tire-wheel assembly of a vehicle, in particular a motorized two-wheeled vehicle (motorcycle).

When considering the temperature of a tire, the parameter of interest is generally a temperature relative to a reference temperature. The physical magnitude (G) is then the difference between the temperature of the tire and a reference temperature. For example, the ambient temperature, the temperature of the vehicle's engine oil, or else the temperature of the cooling water can in particular serve as the reference temperature.

In a preferred embodiment stage (A) of the process according to the invention (i.e. the establishment of an averaged calibration function) is carried out once and for all, upstream, for example by the sensor manufacturer.

Stages (B) and (C) are preferably carried out periodically. In the context of measuring the temperature of a vehicle tire, these stages involve measuring the temperature of the tire when the latter is at a temperature known in any case. The simplest configuration is to use the ambient temperature as the reference temperature and determine the sensor's deviation when it is certain that the tire is at ambient temperature, i.e. when the vehicle is at rest. To avoid periods during which, although the vehicle is at rest, the tire is still cooling and has not yet reached ambient temperature, it is proposed to carry out stage (B) only when the duration of the stop has exceeded a predetermined limit (for example, one hour).

Several means can be used to detect that the vehicle is at rest; the presence of the ignition key, the condition of the clutch (dead point), the mileage of the mileage counter, the engine speed, or one of the parameters furnished by an ABS system can be mentioned. In the case of a motorcycle the use of a weight sensor could also be envisaged, from which the rider's absence can be concluded.

The invention could usefully be applied to sensors other than SAW sensors which are also characterized by poor reproducibility.

BRIEF DESCRIPTION OF THE FIGURES

The invention will be better understood thanks to the description of the figures, in which.

DETAILED DESCRIPTION OF THE FIGURES

Figure 1:
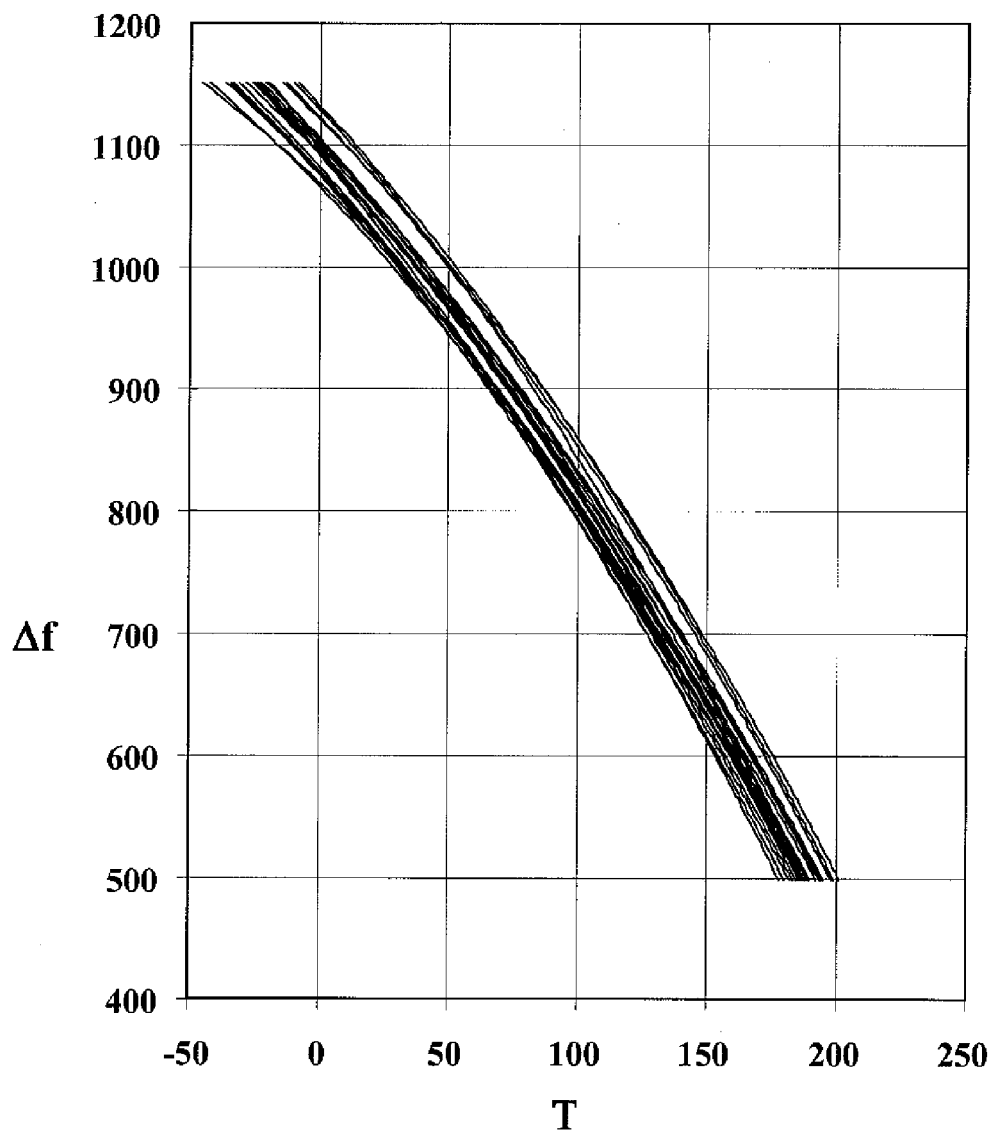
FIG. 1 shows the scatter of the values obtained with about 20 different SAW sensors

FIG. 1 shows the scatter of the values obtained with about 20 SAW sensors of the same type. The graph shows the difference $\Delta f = f2 - f1$ for each of the sensors (in KHz), as a function of the temperature, $\Delta f = F_C^i(T)$. Having regard to the standard deviation of the distribution of values for the sensors considered, it is clear that the measurement precision cannot be better than about 20° C., which is insufficient for a number of measurements such as the monitoring of a tire temperature.

The basic idea of the invention is to establish an averaged calibration function $(F_C^{moy}(T))$, which corresponds for example to the average of the values obtained with N different sensors, $$F_C^{moy}(T) = \frac{1}{N} \cdot \sum_i^N F_C^i(T),$$

and to determine, at a given point ($T=T_0$), the deviation $\delta^{Cap}$ of the sensor considered relative to this averaged function:

$$\delta^{Cap} = F_C^{moy}(T_0) - F_C^{Cap}(T_0)). \qquad (4)$$

An approximation is then adopted, which consists in considering that the deviation remains constant throughout the range of temperatures considered. For the sensor considered, a new function is therefore established:

$$F_C^{Cap,corr}(T) = F_C^{Cap}(T) - \delta^{Cap} = F_C^{Cap}(T) - F_C^{Cap}(T_0) + F_C^{Moy}(T_0) \qquad (5)$$

Figure 2:
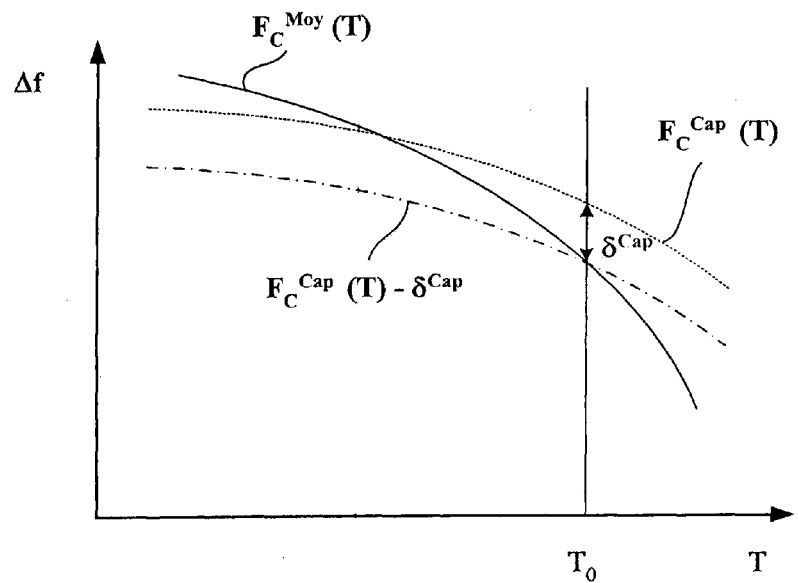
FIG. 2 illustrates several functions useful for understanding the process according to an embodiment of the invention

FIG. 2 illustrates these different magnitudes. Once the function $F_C^{Cap,corr}(T)$ has been determined, it is easy to attribute a corrected temperature $T^{corr}$ by inversion to each frequency $\Delta f$ of the sensor:

$$T^{corr} = (F_C^{Cap,corr})^{-1}(\Delta f) \qquad (6)$$

Figure 3:
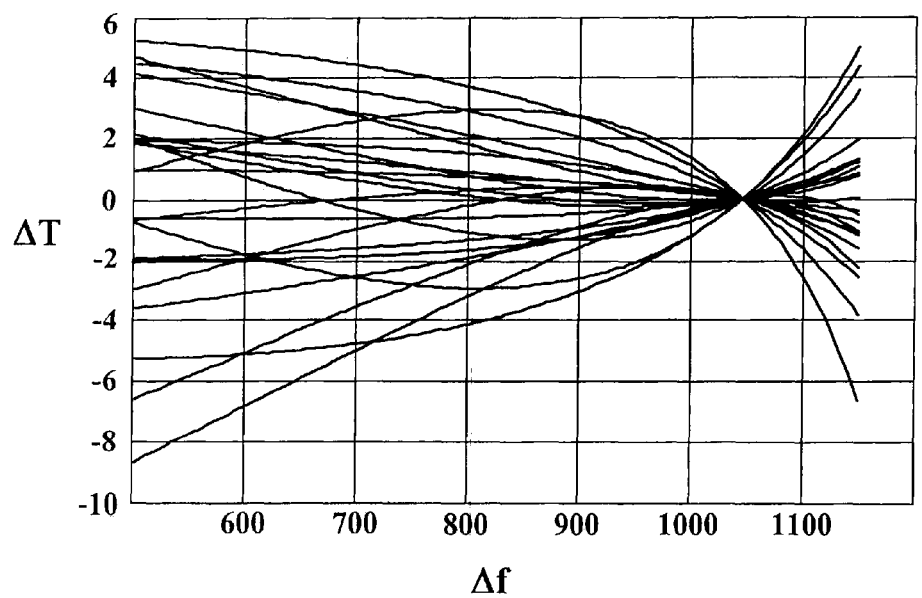
FIG. 3 represents the temperature deviation $\Delta T$ between the SAW sensors of FIG. 1 and the averaged calibration function, as a function of the value of $\Delta f$, after correction of the deviation at a temperature point $T_0$

FIG. 3 illustrates the validity of the approximation adopted earlier for the sensors of FIG. 1. For each value $\Delta f$ (in KHz) the graph shows the difference between the temperature obtained with each sensor i and the temperature corresponding to the averaged calibration function, after a correction of the deviation at a reference temperature of 20° C.:

$$\Delta T^i = (F_C^{Cap,corr})^{-1}(\Delta f) - (F_C^{Moy})^{-1}(\Delta f) \quad (7)$$

It is found that, for this example, the approximation according to the invention gives a deviation smaller than 5° C. for all the sensors considered and over most of the temperature range considered, compared with the precision of the order of 20° C. mentioned in the description of FIG. 1. At a "real" temperature of 100° C., corresponding to a Δf of 800 KHz, the precision is about ±4° C.: the measurement precision is improved by a factor of 3.

Figure 4:
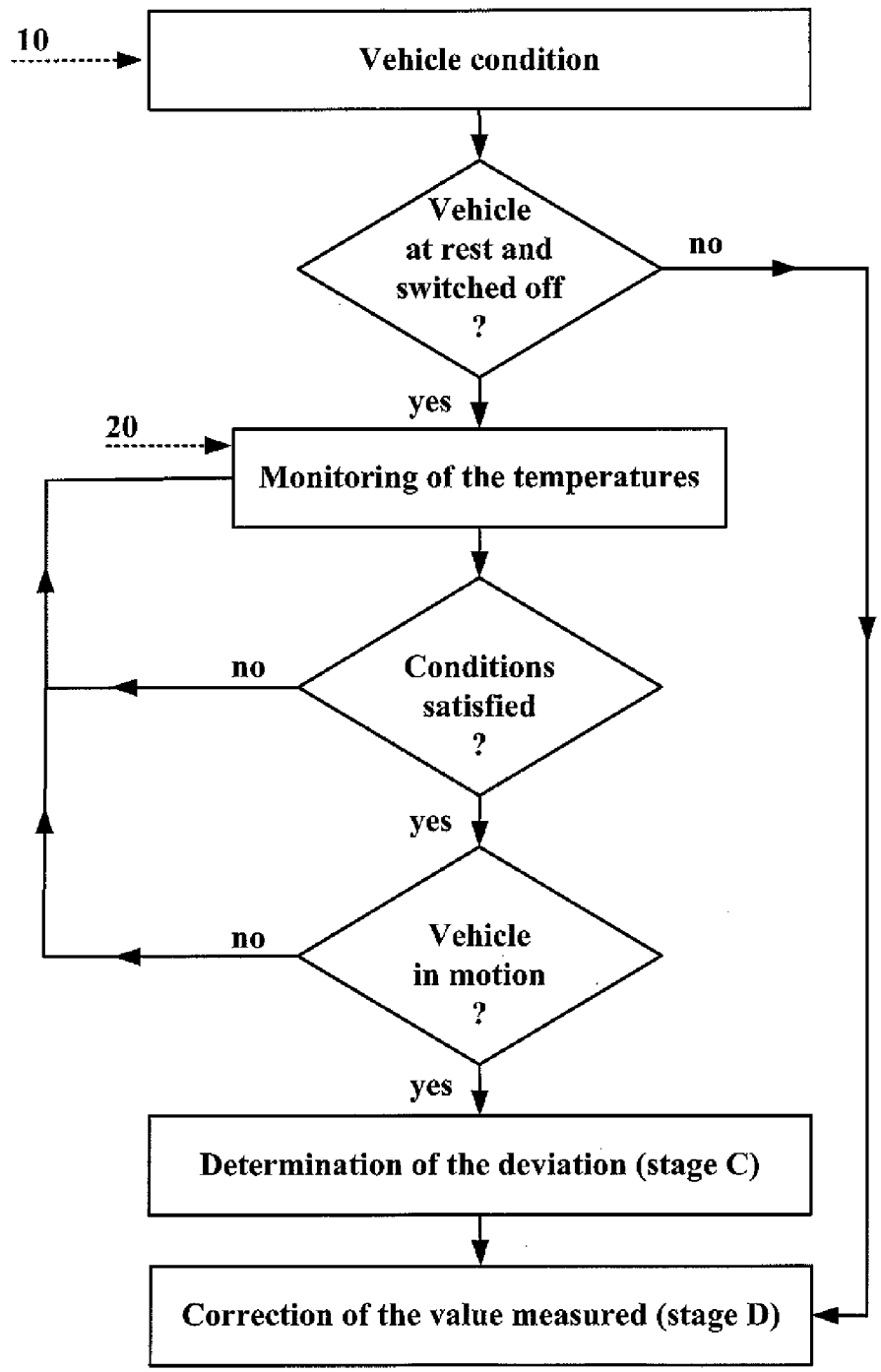
FIG. 4 shows schematically application to a vehicle of the process according to an embodiment of the invention

FIG. 4 shows schematically the principle of the application of the process according to the invention to a vehicle, at a time when stage (A) of the process according to the invention has already been carried out: thus, the averaged calibration function $F_C^{moy}(G)$ of the sensor model used is available.

The vehicle is in a certain condition, characterized by the magnitudes 10 which may include the "contact" position of the ignition key, the condition of the clutch (dead point), the mileage of the mileage counter, the number of revolutions of the engine, or one of the parameters furnished by an ABS system. In the first instance it is a question of determining whether the vehicle is at rest (and switched off) or not.

If the vehicle is at rest and switched off, the temperatures are examined. The system "awaits" the moment when the conditions for calibration are satisfied, for example when the vehicle has been at rest for a specified time or when the engine oil temperature is equal to the ambient temperature, etc. If those conditions are not satisfied, the system continues monitoring the temperatures. When the conditions are satisfied, the moment when the vehicle is restarted is awaited and stages (B) and (C) of the process according to the invention are then carried out. In the case considered, the reference temperature is determined (for example the ambient temperature, the vehicle's engine oil or cooling liquid temperature, the temperature of the air in the air intake system, the temperature of a TPMS system [i.e. a tire pressure monitoring system], etc.), which is among or deduced from the measured magnitudes 20 available. If this reference temperature is within a value range deemed acceptable (for example, if the oil temperature is taken as reference, the system waits until the engine has cooled down sufficiently after use), the deviation between the temperature of the tire (as obtained by the SAW sensor) and that temperature is determined. The sensor is then calibrated as described earlier, taking this deviation into account.

If, on the contrary, the vehicle is not at rest, the deviation is not determined but deviation values obtained previously are used.

In the example of FIG. 4, the system waits for the vehicle to be restarted before carrying out the actual calibration. This can prove useful when the temperature of a motorcycle tire is measured. Given the reading distances of the systems currently in use, a reliable reading of the sensor's response is only possible when the vehicle is moving: one can then be sure that the sensor is periodically close to the reader device, which is not necessarily so when the vehicle is at rest. This, however, is not a necessity inherent in the method according to the invention. If a system is available which allows reading from a greater distance (of the order of a meter in the case of a motorcycle), one can jump from the second interrogation loop in the figure ("Vehicle in motion?") directly to stage (C) when the calibration conditions are satisfied.

To illustrate the invention still better a simple case can be considered, namely a situation where the "signature" of the SAW sensor can be expressed as a polynomial of the $2^{nd}$ degree:

$$\Delta f^{Cap} = F_C^{Cap}(T) = C_0 + C_1 \cdot (T - T_R) + C_2 \cdot (T - T_R)^2 \quad (8)$$

where $C_0$, $C_1$ and $C_2$ are coefficients and $T_R$ is a reference temperature (not to be confused with the reference temperature $T_0$ of the method according to the invention).

This function can easily be inverted; the value obtained for the temperature measured by the sensor is:

$$T^{Cap} = A_0 + \sqrt{A_1 + A_2 \cdot \Delta f^{Cap}} \quad (9)$$

where $A_0$, $A_1$ and $A_2$ are coefficients which can be expressed without difficulty in terms of $C_0$, $C_1$ and $C_2$ and $T_R$.

The values measured can be corrected in several ways, three of which will be described below.

Consider a reference (or "reset") temperature $T_0$ at which the calibration method operates.

Firstly ("Logic 1") the frequency deviation can be determined and consequently corrected. By defining:

$$\delta^{Cap} = F_C^{moy}(T_0) - F_C^{Cap}(T_0) \quad (10)$$

one obtains:

$$T^{corr} = A_0 + \sqrt{A_1 + A_2 \cdot (\Delta f^{Cap} + \delta)} \quad (11)$$

Secondly, the temperature deviation can be determined. A first route ("Logic 2") consists in considering the average sensitivity S of the sensors, i.e. the average slope of the derivative of the averaged calibration function within the temperature range considered. It can then be postulated that:

$$T^{offset} = S \cdot \delta^{Cap} \quad (12)$$

and the following correction can be introduced:

$$T^{corr} = A_0 + \sqrt{A_1 + A_2 \cdot \Delta f^{Cap}} + T^{offset} \quad (13)$$

Another route ("Logic 3") avoids having to use the average sensitivity. The temperature deviation (between the "real" temperature and the temperature $T^{Cap}$ furnished by the SAW sensor) is determined at the reference temperature $T_0$:

$$T^{offset} = T_0 - T_0^{Cap} \quad (14)$$
$$= T_0 - (F_C^{Cap})^{-1}(\Delta f^{Cap})$$

and the procedure of "Logic 2" then follows:

$$T^{corr} = A_0 + \sqrt{A_1 + A_2 \cdot \Delta f^{Cap}} + T^{offset} \quad (15)$$

Figure 5:
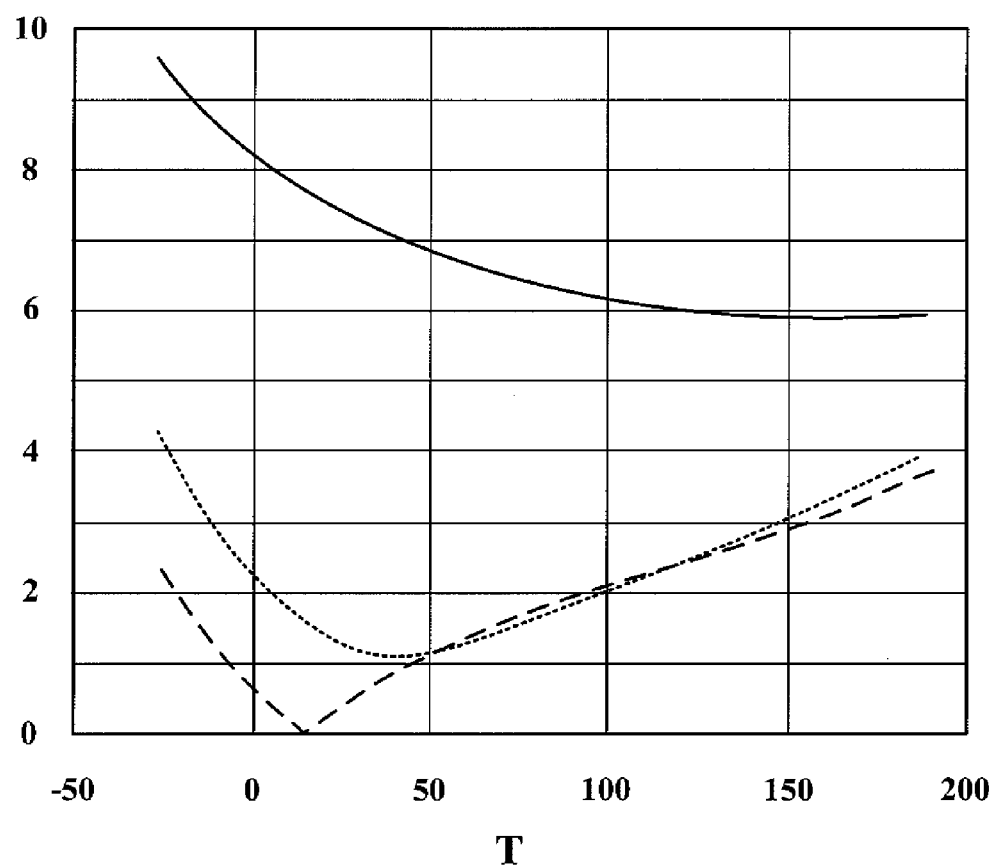
FIG. 5 illustrates the precision of the results obtained via the mean square error ($\sigma$) for three different correction logics

FIG. 5 illustrates the precision of the results obtained, for the three different logics. The mean square error (a) between the "real" temperature to be measured and the temperature determined by the SAW sensor has been plotted as a function of the temperature (° C.). The full curve corresponds to the results obtained with a randomly chosen sensor, without any correction. The results obtained with the three logics described above (here, for $T_0 = 20°$ C.) are also shown: the curve shown as a broken line corresponds to "Logic 1" (easy to recognize, since the squared error must be 0 at $T_0$), and the dotted curve to "Logic 2" (unsurprisingly, less precise near $T_0$). The curve corresponding to "Logic 3" has not be reproduced, since it is in effect very close to the curve corresponding to "Logic 1".

The improvement of the measurement precision is very clear for the two logics. At a temperature of 100° C., σ is reduced by a factor of 3 compared with the situation with no correction. Instead of a precision of ±18° C., a precision of about ±6° C. is obtained.

Other logics are of course possible. Fundamentally, whatever the logic chosen, the basic concept is always the same: one relies on knowledge of the average sensor, available thanks to a statistical study (most often carried out by the supplier of the sensor) of the calibration functions of the sensors (mean, standard deviation). For a given sensor, a correction frequency or temperature is determined carefully by comparing the sensor in question with the average sensor within a very limited range of frequencies or temperatures, and the correction is extrapolated by considering it applicable to all the frequencies or temperatures at which the sensor is deemed suitable for operation.

The invention claimed is:

1. A machine implemented calibration process for a differential resonator type surface acoustic wave (SAW) sensor of a first model incorporated in an assembly, the SAW sensor having two resonance frequencies which vary differently as a function of the value of a physical magnitude of the assembly, the process:
    reading the first and second frequencies of the SAW sensor by a reader device;
    determining a difference between the two resonance frequencies of the SAW sensor when the physical magnitude corresponds to a predetermined value, by a processing device;
    determining the deviation of the SAW sensor relative to an averaged calibration function, in frequency or in terms of the difference between the value provided by the sensor and the predetermined value, by the processing device, the averaged calibration function being obtained by averaging over a plurality of SAW sensors of the first model; and
    determining a corrected value of the physical magnitude output by the SAW sensor, taking account of said deviation, by the processing device.

2. The calibration process of claim 1, wherein the assembly is a tire-wheel assembly of a vehicle.

3. The calibration process of claim 2, comprising determining the difference between the two resonance frequencies of the SAW sensor when the vehicle is at rest.

4. The calibration process of claim 3, comprising determining that the vehicle is at rest by evaluating a parameter that characterizes the condition of the vehicle, chosen from the group consisting of: the presence of the ignition key, the condition of the clutch (dead point), the mileage of the mileage counter, the number of revolutions of the engine, and a parameter furnished by an ABS system.

5. The calibration process of claim 3, comprising determining the difference between the two resonance frequencies of the SAW sensor only when the duration of the rest has exceeded a predetermined time.

6. The calibration process of claim 2, wherein the physical magnitude is the difference between the temperature of the tire and a reference temperature.

7. The calibration process of claim 6, wherein the reference temperature is chosen from the group consisting of: the ambient temperature, the temperature of the vehicle's engine oil, the temperature of the cooling water.

8. The calibration process of claim 2, wherein the vehicle is a motorized two-wheeled vehicle.

9. The calibration process of claim 1, further comprising:
    establishing an averaged calibration function relating the difference between the two resonance frequencies and the physical magnitude, said average calibration function being obtained by averaging over a plurality of SAW sensors of the first model.

10. The calibration process of claim 9, wherein the averaged calibration function ($F_c^{moy}(G)$) is obtained by averaging calibration functions ($F_c^i(G)$) of each SAW sensor of the plurality of sensors in accordance with the formula:

$$F_C^{moy}(G) = \frac{1}{N} \cdot \sum_i^N F_C^i(G).$$

11. The calibration process of claim 1, wherein the deviation of the SAW sensor is a frequency deviation ($D_f^{Cap} = F_c^{moy}(G_O) - \Delta f_0^{Cap}$) and the corrected value of the physical magnitude ($G^{corr}$) to be furnished by the SAW sensor for a difference ($\Delta f^{Cap}$) between the two resonance frequencies of the sensor is determined by the processing device as follows:

$$G^{corr} = (F_c^{moy})^{-1} (\Delta f^{Cap} + F_c^{moy}(G_O) - \Delta f_0^{Cap})$$

where $(F_c^{moy})^{-1}(\Delta f)$ denotes the reciprocal of the averaged calibration function $F_c^{moy}(G)$.

12. The calibration process of claim 1, wherein the deviation of the SAW sensor is in units of G ($D_G^{moy} = G_0 - (F_c^{moy})^{-1}(\Delta f_0^{Cap})$) and the corrected value ($G^{corr}$) of the physical magnitude to be furnished by the SAW sensor for a difference of ($\Delta f^{Cap}$) between the two resonance frequencies of the SAW sensor is determined by the processing device as follows:

$$G^{corr} = (F_c^{moy})^{-1}(\Delta f^{Cap}) - (F_c^{moy})^{-1}(\Delta f_0^{Cap}) + G_0$$

where $(F_c^{moy})^{-1}(\Delta f)$ denotes the reciprocal of the averaged calibration function $F_c^{moy}(G)$.

13. The calibration process of claim 1, wherein the physical magnitude is a temperature.

14. The calibration process of claim 1, wherein establishing the averaged calibration function is carried out upstream.

* * * * *